United States Patent
Tanaka et al.

(10) Patent No.: US 9,052,716 B2
(45) Date of Patent: Jun. 9, 2015

(54) SYSTEM FOR INDICATING PARKING POSITION AND DIRECTION OF DUMP TRUCK AND HAULING SYSTEM

(71) Applicant: Hitachi Construction Machinery Co., Ltd., Bunkyo-ku, Tokyo (JP)

(72) Inventors: Wataru Tanaka, Tokyo (JP); Masanori Ichinose, Tokyo (JP); Tomohiko Yasuda, Tsuchiura (JP); Takayuki Sato, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/352,289

(22) PCT Filed: Oct. 16, 2012

(86) PCT No.: PCT/JP2012/076739
§ 371 (c)(1),
(2) Date: Apr. 16, 2014

(87) PCT Pub. No.: WO2013/058247
PCT Pub. Date: Apr. 25, 2013

(65) Prior Publication Data
US 2014/0261152 A1    Sep. 18, 2014

(30) Foreign Application Priority Data
Oct. 17, 2011  (JP) ................ 2011-228170

(51) Int. Cl.
*G05D 1/02* (2006.01)
*E02F 9/20* (2006.01)
(Continued)

(52) U.S. Cl.
CPC ............. *G05D 1/02* (2013.01); *E02F 9/2033* (2013.01); *E02F 9/265* (2013.01); *B60P 1/283* (2013.01); *B60P 1/30* (2013.01); *E02F 9/205* (2013.01)

(58) Field of Classification Search
USPC .......................................................... 701/50
See application file for complete search history.

(56) References Cited

U.S. PATENT DOCUMENTS 4,332,517 A * 6/1982 Igarashi et al. ................. 701/50
5,116,186 A * 5/1992 Hanamoto et al. ............ 414/694
(Continued)

FOREIGN PATENT DOCUMENTS

JP    4-250990 A    9/1992
JP    6-19536 A    1/1994
(Continued)

OTHER PUBLICATIONS

Corresponding International Search Report with English Translation dated Dec. 25, 2012 (three (3) pages).
(Continued)

*Primary Examiner* — Thomas Tarcza
*Assistant Examiner* — Alex C Dunn
(74) *Attorney, Agent, or Firm* — Crowell & Moring LLP

(57) ABSTRACT

A dump truck parking position/direction indication system and a hauling system are provided that allow the operator of a loading machine to determine a parking position and a parking direction of a dump truck. The dump truck parking position/direction indication system includes: a bucket position detection device which detects the position of a bucket of the loading machine; a locus calculation device which calculates a movement locus of the bucket based on the positions of the bucket detected by the bucket position detection device; a parking position/direction determination device which determines the parking position and the parking direction of the dump truck based on the movement locus calculated by the locus calculation device; and an output device which outputs the parking position and the parking direction of the dump truck determined by the parking position/direction determination device.

16 Claims, 11 Drawing Sheets

(51) Int. Cl.
  *E02F 9/26* (2006.01)
  *B60P 1/28* (2006.01)
  *B60P 1/30* (2006.01)

(56) References Cited

U.S. PATENT DOCUMENTS

| | | | |
|---|---|---|---|
| 5,178,510 A * | 1/1993 | Hanamoto et al. | 414/694 |
| 5,682,312 A * | 10/1997 | Rocke | 701/50 |
| 5,918,527 A * | 7/1999 | Haga et al. | 91/363 R |
| 5,953,838 A * | 9/1999 | Steenwyk | 37/348 |
| 6,044,312 A | 3/2000 | Sudo et al. | |
| 6,059,511 A * | 5/2000 | Anderson et al. | 414/408 |
| 6,098,322 A * | 8/2000 | Tozawa et al. | 37/414 |
| 7,222,444 B2 * | 5/2007 | Hendron et al. | 37/348 |
| 7,856,282 B2 * | 12/2010 | Tabor | 700/63 |
| 7,979,181 B2 * | 7/2011 | Clark et al. | 701/50 |
| 8,160,783 B2 * | 4/2012 | Shull | 701/50 |
| 8,463,508 B2 * | 6/2013 | Nicholson et al. | 701/50 |
| 8,548,693 B2 * | 10/2013 | Numazaki et al. | 701/50 |
| 8,644,964 B2 * | 2/2014 | Hendron et al. | 700/56 |
| 8,886,415 B2 * | 11/2014 | Shatters et al. | 701/50 |
| 2005/0138850 A1 * | 6/2005 | Brickner et al. | 37/348 |
| 2014/0121840 A1 * | 5/2014 | Mizuochi et al. | 700/275 |

FOREIGN PATENT DOCUMENTS

| | | |
|---|---|---|
| JP | 6-19538 A | 1/1994 |
| JP | 8-263138 A | 10/1996 |

OTHER PUBLICATIONS

Japanese-language Written Opinion dated Dec. 25, 2012 (PCT/ISA/237) (three (3) pages).

* cited by examiner

SYSTEM FOR INDICATING PARKING POSITION AND DIRECTION OF DUMP TRUCK AND HAULING SYSTEM

TECHNICAL FIELD

The present invention relates to a dump truck parking position/direction indication system and a hauling system that determine the parking position and the parking direction of a dump truck (used in an open pit mine or the like) with respect to a loading machine.

BACKGROUND ART

In places like open pit mines, an operation for loading mined, quarried or excavated materials (hereinafter referred to as "extracted materials") such as minerals, earth and sand onto a dump truck is carried out by using a loading machine such as a hydraulic excavator or a wheel loader. In this operation, the dump truck is required to stop and park at/in appropriate position and direction with which the loading operation by the loading machine can be performed easily. This parking operation is generally carried out by the operator of the dump truck.

Meanwhile, autonomous dump trucks capable of traveling autonomously without needing the operator have been proposed in order to reduce the costs and improve the safety.

In the case of a dump truck operated by an operator, the parking position and the parking direction of the dump truck with respect to the loading machine can be determined by the operator. However, an autonomous dump truck has to autonomously determine the parking position and the parking direction.

A conventional technology regarding such an autonomous dump truck has been disclosed in JP,A 8-263138 (Patent Literature 1), for example. The Patent Literature 1 describes a technology for determining the parking position and the parking direction of the autonomous dump truck at/in relative position and direction previously fixed with respect to the position of the loading machine.

PRIOR ART LITERATURE

Patent Literature

Patent Literature 1: JP-8-263138-A

SUMMARY OF THE INVENTION

Problem to be Solved by the Invention

The conventional technology described in the Patent Literature 1 involves the following problems:

In the conventional technology of the Patent Literature 1, the relative positional relationship between the position of the loading machine (hydraulic excavator, wheel loader, etc.) and the parking position and the parking direction of the autonomous dump truck is previously determined and fixed. In this case, the operator of the loading machine in the actual site of the loading operation cannot flexibly change the parking position and the parking direction of the autonomous dump truck to a position and direction that let the operator easily perform the loading operation. Thus, there is a possibility that the dump truck is necessitated to park at/in inappropriate position and direction for the operation of the loading machine and the working efficiency can deteriorate.

Further, in ordinary mines, various types of loading machines such as hydraulic excavators and wheel loaders are operated at the same time and the type of the loading machine for performing the loading operation onto the dump truck changes depending on the place and the time. Thus, it is necessary to appropriately change the parking position and the parking direction of the dump truck depending on the type of the loading machine. However, such a need cannot be satisfied by the conventional technology described in the Patent Literature 1.

It is therefore the primary object of the present invention to provide a dump truck parking position/direction indication system and a hauling system that allow the operator of the loading machine to determine a parking position and a parking direction of the dump truck that let the operator easily perform the loading operation and to make the dump truck stop and park at the parking position and in the parking direction.

Means for Solving the Problem

To resolve the above problems, a dump truck parking position/direction indication system in accordance with the present invention comprises: a bucket position detection device which detects the position of a bucket of a loading machine; a locus calculation device which calculates a movement locus of the bucket based on the positions of the bucket detected by the bucket position detection device; a parking position/direction determination device which determines a parking position and a parking direction of a dump truck based on the movement locus calculated by the locus calculation device; and an output device which outputs the parking position and the parking direction of the dump truck determined by the parking position/direction determination device.

To resolve the above problems, a hauling system in accordance with the present invention comprises: a loading machine, a dump truck, and the aforementioned bucket position detection device, locus calculation device, parking position/direction determination device and output device.

In the above hauling system equipped with the parking position/direction determination device, the operator of the loading machine can determine a parking position and a parking direction of the dump truck that let the operator easily perform the loading operation and can make the dump truck stop and park at the parking position and in the parking direction.

Effect of the Invention

According to the present invention, the operator of the loading machine is allowed to determine a parking position and a parking direction of the dump truck that let the operator easily perform the loading operation and to make the dump truck stop and park at the parking position and in the parking direction. Consequently, the operation can be performed efficiently.

MODE FOR CARRYING OUT THE INVENTION

Figure 1:
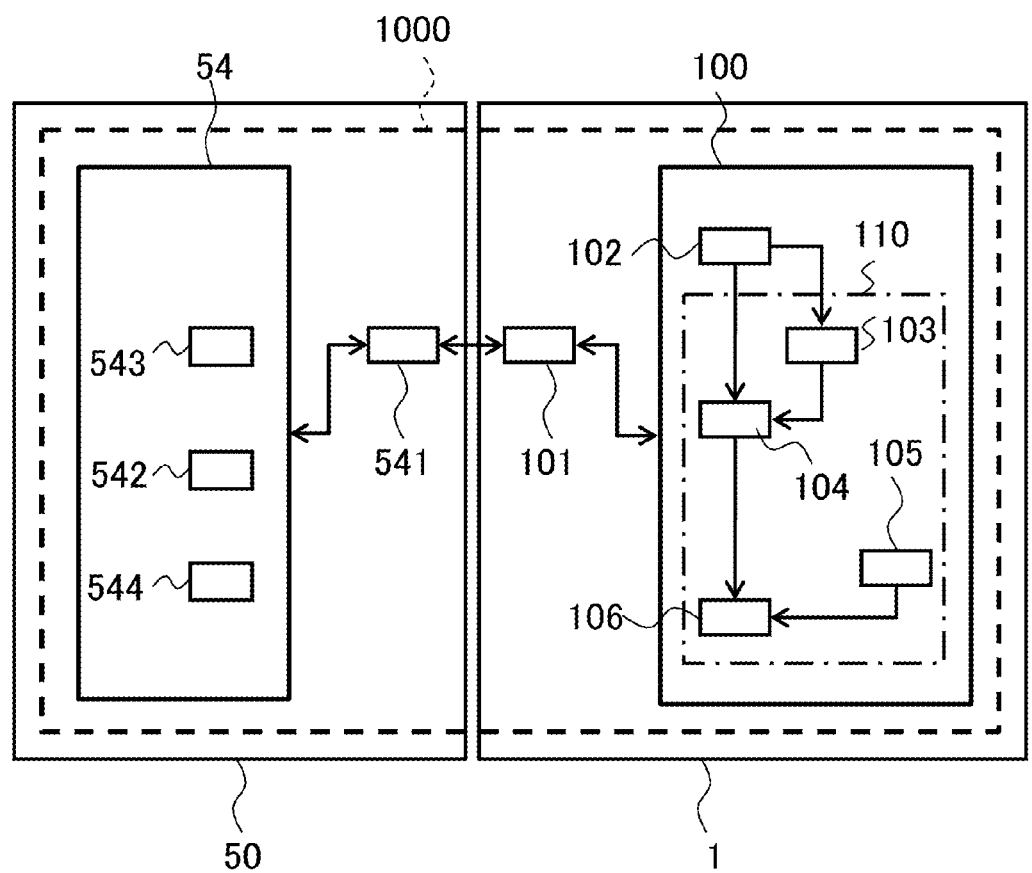
FIG. 1 is a block diagram showing the overall configuration of a dump truck parking position/direction indication system in accordance with a first embodiment of the present invention.

Referring now to the drawings, a description will be given in detail of preferred embodiments of the present invention.

First Embodiment

FIG. 1 is a block diagram showing the overall configuration of a dump truck parking position/direction indication system and a hauling system in accordance with a first embodiment of the present invention.

Figure 2:
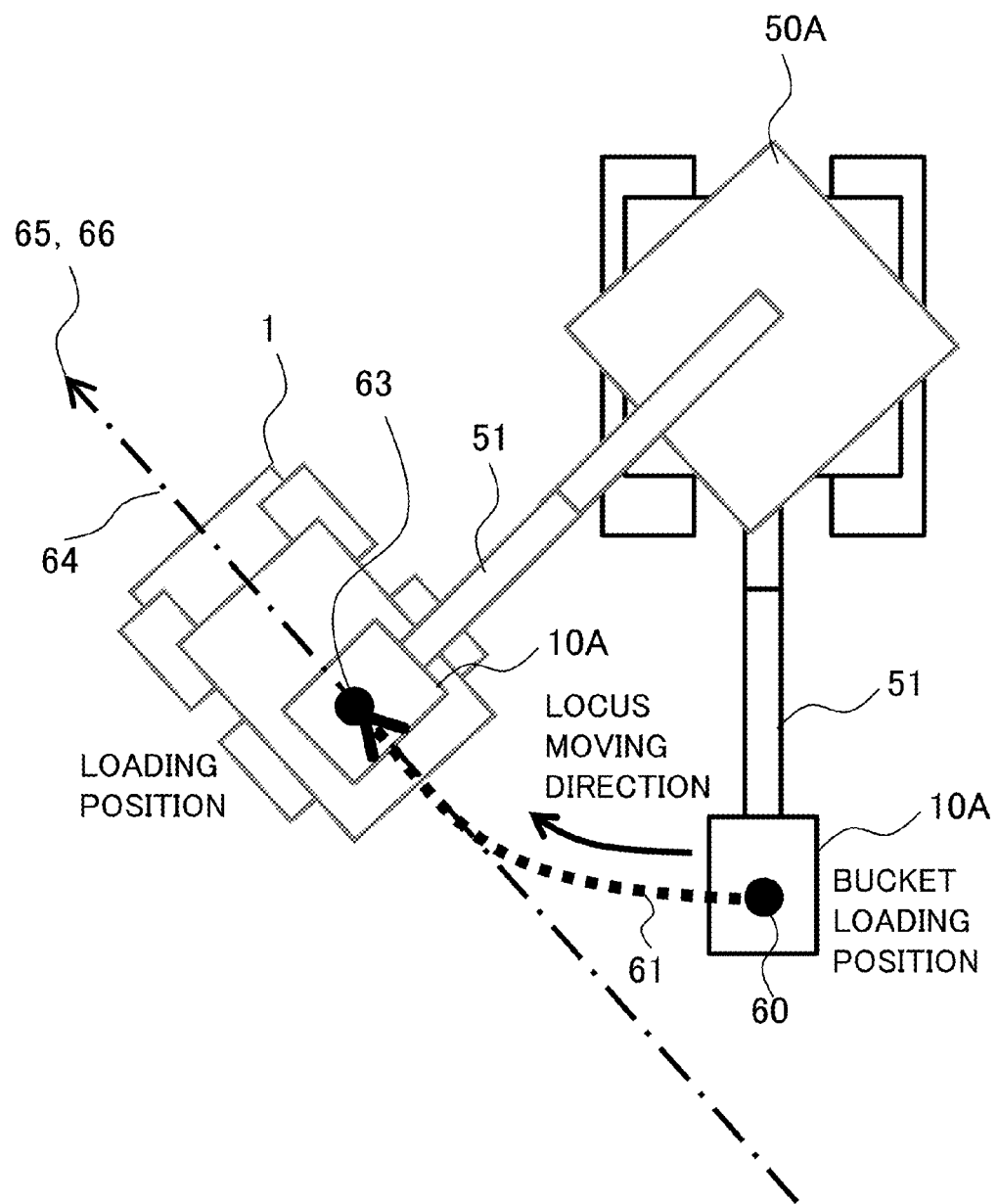
FIG. 2 is a schematic diagram showing the concept of determining the parking position and the parking direction of a dump truck based on the movement locus of the bucket of a loading machine (showing a case where a hydraulic excavator is employed as an example of the loading machine).

FIG. 2 is a schematic diagram showing the concept of determining the parking position and the parking direction of the dump truck based on the movement locus of the bucket of the loading machine. FIG. 2 shows a case where a hydraulic excavator is employed as an example of the loading machine.

In FIGS. 1 and 2, the dump truck parking position/direction indication system is indicated with the reference character "1000". The parking position/direction indication system 1000 mainly comprises a loading machine data calculation device 54, a parking position/direction calculation device 100, a loading machine communication device 541 and a dump truck communication device 101. The loading machine data calculation device 54 and the loading machine communication device 541 are installed in a loading machine 50, while the parking position/direction calculation device 100 and the dump truck communication device 101 are installed in a dump truck 1. The loading machine 50, the dump truck 1 and the parking position/direction indication system 1000 constitute the hauling system in accordance with the present invention. The loading machine 50 is equipped with a bucket 10 as a vessel for holding and moving the extracted materials (earth, sand, minerals, etc.) or the like to the loading position.

The loading machine data calculation device 54 mainly includes a bucket position detection device 542 which measures the position of the bucket 10 of the loading machine 50, a loading detection device 543 which detects the loading of the extracted materials onto the bucket 10, and a loading machine type detection device 544 which detects the type of the loading machine 50.

The bucket position detection device 542 is configured to be able to detect the position of the bucket 10 by employing a GNSS (global navigation satellite system capable of detecting the ground position) for the bucket 10 or a corresponding part, for example, and to notify the dump truck 1 of the positional information via the loading machine communication device 541 and the dump truck communication device 101. The loading detection device 543 is configured to be able to detect the loading of the extracted materials onto the bucket 10 by detecting variations in the load on the bucket 10, for example, and to notify the dump truck 1 of the loading information via the loading machine communication device 541 and the dump truck communication device 101. The loading machine type detection device 544, to which an ID (determined corresponding to each loading machine 50) has previously been assigned, for example, is configured to be able to notify the dump truck 1 of the ID via the loading machine communication device 541 and the dump truck communication device 101.

The parking position/direction calculation device 100 includes a bucket locus calculation device 102 and a parking position/direction determination device 110. The bucket locus calculation device 102 calculates the movement locus 61 of the bucket 10 of the loading machine 50 based on the positions of the bucket 10 detected by the bucket position detection device 542 of the loading machine 50. The parking position/direction determination device 110 determines the parking position 63 and the parking direction 66 of the dump truck 1 based on the movement locus 61 calculated by the bucket locus calculation device 102. The parking position/direction determination device 110 mainly includes a bucket stoppage detection device 103, a tangential direction calculation device 104, a loading machine judgment device 105 and a tangential direction rotation device 106. The bucket stoppage detection device 103 detects a stop position of the bucket 10 from the movement locus 61 calculated by the bucket locus calculation device 102 and determines the stop position of the bucket 10 as the parking position 63 of the dump truck 1. The tangential direction calculation device 104 calculates a tangential direction 65 based on a tangential line 64 to the movement locus 61 (calculated by the bucket locus calculation device 102) at the stop position of the bucket 10 and the moving direction of the movement locus 61. The loading machine judgment device 105 judges the type of the loading machine 50 based on the data supplied from the loading machine type detection device 544. The tangential direction rotation device 106 determines the parking direction 66 by rotating the tangential direction 65 (calculated by the tangential direction calculation device 104) by a prescribed angle corresponding to the type of the loading machine judged by the loading machine judgment device 105.

The bucket locus calculation device 102 is configured to be able to calculate the movement locus 61 of the bucket 10 of the loading machine 50 by calculating the position of the bucket 10 projected on a horizontal plane (horizontal position) and continuously acquiring the horizontal position. The bucket locus calculation device 102 may also be configured to be able to calculate the movement locus 61 by first calculating the three-dimensional movement locus of the bucket 10 and thereafter projecting the three-dimensional movement locus onto a horizontal plane.

The bucket stoppage detection device 103 is configured to be able to detect that the movement locus 61 does not change for a prescribed time period (T1), detect the position where the movement locus 61 does not change as the stop position of the bucket 10, and determine the stop position as the parking position 63.

The tangential direction calculation device 104 is configured to be able to calculate the tangential line 64 to the movement locus 61 at the parking position 63 and determine the moving direction of the movement locus 61 at the tangential line 64 as the tangential direction 65.

The loading machine judgment device 105 is configured to be able to judge the type of the loading machine 50 based on the data detected by the loading machine type detection device 544. For example, an ID has previously been assigned to the loading machine 50 and also stored in the loading machine judgment device 105. When the loading machine type detection device 544 transmits the ID to the loading machine judgment device 105, the loading machine judgment device 105 implements the function of judging the type of the loading machine 50 by verifying the received ID against stored IDs, for example. In cases where the mine is equipped with a control station for managing the status and operation of the dump trucks 1, the loading machines 50, etc. and issuing allocation instructions (dispatch instructions) to the dump trucks 1, the function of judging the type of the loading machine 50 can also be implemented as follows, for example: At the stage when the control station determined the next loading site to which a dump truck 1 should go, the control station transmits an ID corresponding to the type of the loading machine 50 operating in the loading site to the dump truck 1. The loading machine judgment device 105 of the dump truck 1 verifies the received ID against stored IDs.

The tangential direction rotation device 106 is configured to be able to determine the parking direction 66 by rotating the tangential line 64 around a vertical axis orthogonal to the horizontal plane and passing through the parking position 63 by a prescribed angle corresponding to the type of the loading machine 50 judged by the loading machine judgment device 105 so that the tangential direction 65 points the side opposite to the bucket loading position 60. For example, in cases where the loading machine 50 is a hydraulic excavator, the prescribed rotation angle has been set at 0 degrees so as not to rotate the tangential line 64. In cases where the loading machine 50 is a wheel loader, the prescribed rotation angle has been set at 90 degrees. The system may also be configured so that the prescribed angle used for determining the parking direction 66 can be modified by the operator's operation on an operating device. Especially when the loading machine 50 is a hydraulic excavator, allowing the modification of the prescribed angle based on conditions (e.g., the presence/absence of an obstacle in the vicinity of the parking position) is convenient since necessary measures can be taken flexibly with respect to the parking position of the dump truck.

The parking position 63 and the parking direction 66 of the dump truck 1 determined by the parking position/direction determination device 110 are sent to an autonomous travel device 200 of the dump truck 1 via an output device 120 (see FIG. 3) of the parking position/direction calculation device 100.

Figure 3:
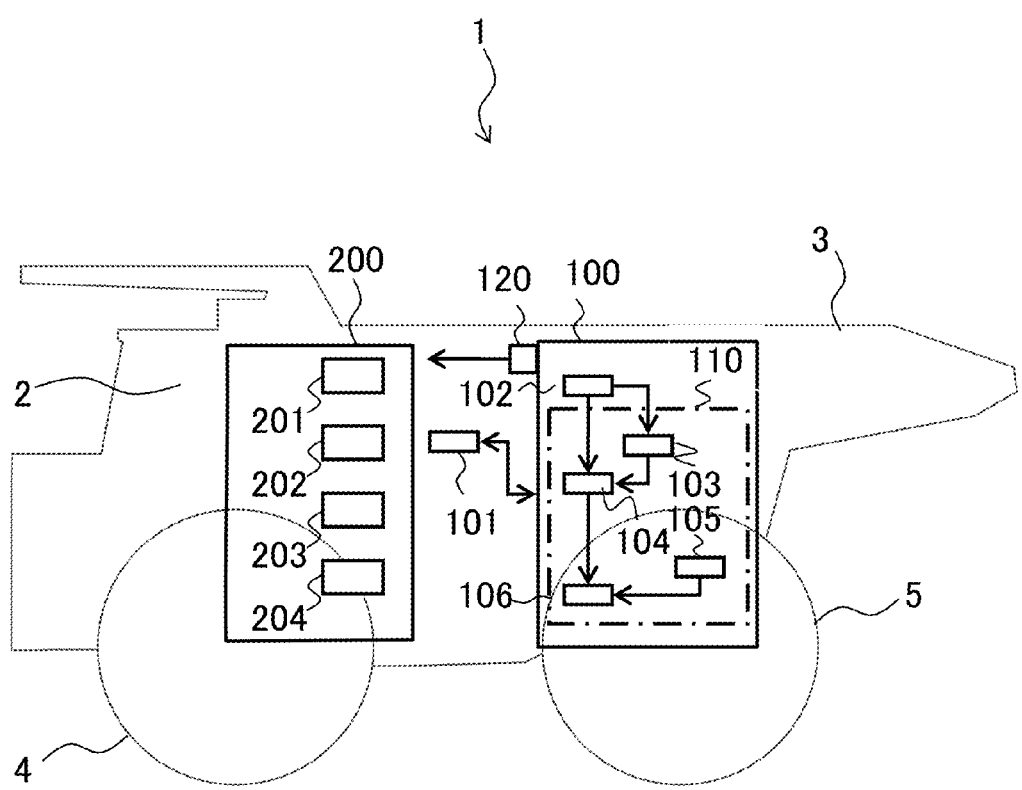
FIG. 3 is a schematic diagram showing the overall configuration of the dump truck in the first embodiment of the present invention.

FIG. 3 is a schematic diagram showing the overall configuration of a dump truck in accordance with an embodiment of the present invention. The dump truck shown in FIG. 3 is a large-sized hauling vehicle for carrying the extracted materials mined from an open pit, quarry, mine, etc. (so-called "mining dump truck") that is capable of traveling autonomously without the need of operation by the operator (autonomous dump truck).

The dump truck (vehicle) 1 shown in FIG. 3 comprises a vehicle 2 formed of a solid frame structure, a vessel (body) 3 mounted on the vehicle 2 to be elevatable, front wheels 4 and rear wheels 5 attached to the vehicle 2, and the autonomous travel device 200 for controlling the dump truck 1 for the autonomous traveling. As mentioned above, the dump truck 1 is equipped with the parking position/direction calculation device 100 for calculating the parking position 63 and the parking direction 66 of the dump truck 1 and the dump truck communication device 101 capable of communicating data with the loading machines.

The autonomous travel device 200 mainly includes a target position/direction recognition device 201, an own position/direction recognition device 202, a target path generation device 203 and a target path tracing device 204. The target position/direction recognition device 201 recognizes a target position to which the vehicle (dump truck 1) should move next. The own position/direction recognition device 202 recognizes the current position and direction of the vehicle itself (own position/direction). The target path generation device 203 generates a path of movement (target path) for realizing the target position/direction from the own position/direction. The target path tracing device 204 controls the driving, braking and steering of the vehicle so that the vehicle can move along the target path.

When the target position and direction are commanded, the dump truck 1 (having the above functions of the autonomous travel device 200) realizes the commanded target position and direction by recognizing its own position and direction, generating the target path for realizing the target position and direction, and traveling so as to trace the target path.

The target position/direction recognition device 201 is configured to recognize the target position and direction based on information on the target position and direction (at/in which the dump truck 1 should park) that the autonomous travel device 200 is notified of.

The own position/direction recognition device 202 can be implemented by using sensors such as a GNSS capable of detecting the ground position, an acceleration sensor capable of detecting the acceleration of the vehicle, a gyro sensor capable of detecting the angular speed, and a wheel revolution speed sensor (attached to at least one of the front and rear wheels to detect the wheel revolution speed), for example. The own position/direction recognition device 202 is configured to be able to detect the vehicle's relative position and direction (relative to the vehicle's position and direction at the start of the movement of the vehicle) by using the acceleration sensor, the gyro sensor and the wheel revolution speed sensor. Since the GNSS is capable of directly detecting the position, the own position/direction recognition device 202 is configured to make use of the GNSS for purposes like correcting the position calculated by use of the acceleration sensor, the gyro sensor and the wheel revolution speed sensor.

The target path generation device 203 is configured to be able to calculate a path that can be realized by the dump truck 1 (target path) in consideration of geometrical characteristics and vehicle motion characteristics of the dump truck 1.

The target path tracing device 204 is configured to be able to make the dump truck 1 travel while tracing the target path by comparing the generated target path with its own position and controlling the driving, braking and steering of the dump truck 1 so as to reduce the deviation of the own position from the target path.

Figure 4:
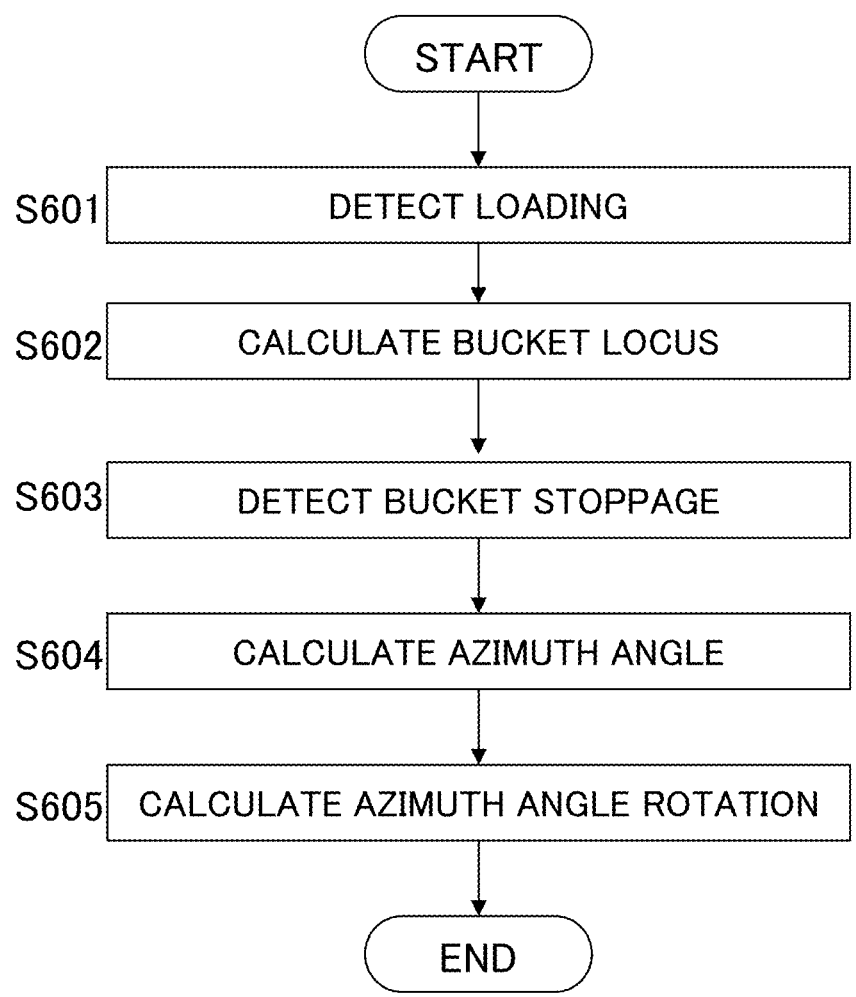
FIG. 4 is a flow chart showing a procedure for determining the parking position and the parking direction of the dump truck in the first embodiment of the present invention.

A procedure for determining the parking position 63 and the parking direction 66 of the dump truck 1 in the loading operation onto the dump truck 1 by the loading machine 50, which is implemented by the above-described configuration, will be explained below by referring to FIG. 4. FIG. 4 is a flow chart showing the procedure for determining the parking position 63 and the parking direction 66 of the dump truck 1 with the configuration of the parking position/direction indication system shown in FIG. 1.

In step 1 (S601), the loading detection device 543 detects the loading of the excavated materials onto the bucket 10. At this point, the loading detection device 543 notifies the bucket locus calculation device 102 of the fact via the loading machine communication device 541 and the dump truck communication device 101.

In step 2 (S602), the bucket locus calculation device 102 receiving the notification from the loading detection device 543 acquires the position of the bucket 10 detected by the bucket position detection device 542 at that time, stores the position of the bucket 10 projected on the horizontal plane (horizontal position) as the bucket loading position 60, and starts the calculation of the movement locus 61.

In step 3 (S603), when it is detected that the movement locus 61 does not change for a prescribed time period (T1), the bucket stoppage detection device 103 detects the position of the bucket 10 at that time as the stop position of the bucket 10, determines the stop position as the parking position 63, and notifies the tangential direction calculation device 104 of the parking position 63.

In step 4 (S604), the tangential direction calculation device 104 calculates the tangential line 64 to the movement locus 61 at the parking position 63, determines the moving direction of the movement locus 61 at the tangential line 64 as the tangential direction 65, and notifies the tangential direction rotation device 106 of the tangential direction 65.

In step 5 (S605), based on the type of the loading machine 50 judged by the loading machine judgment device 105, the tangential direction rotation device 106 rotates the tangential line 64 around the vertical axis orthogonal to the horizontal plane and passing through the parking position 63 by 0 degrees or 90 degrees so that the tangential direction 65 points the side opposite to the starting point of the movement locus 61, and determines the resultant tangential direction 65 (the result of the rotation) as the parking direction 66 of the dump truck 1.

The parking position 63 and the parking direction 66 of the dump truck 1 can be determined by the above procedure. The parking position/direction calculation device 100 notifies the determined parking position 63 and parking direction 66 to the autonomous travel device 200 of the dump truck 1 via the output device 120. The target position/direction recognition device 201 of the autonomous travel device 200 recognizes the received parking position 63 and parking direction 66 as the target position and direction. The autonomous travel device 200 is capable of making the dump truck 1 travel so as to realize the target position and direction.

In ordinary mines, various types of loading machines such as hydraulic excavators 50A (see FIG. 5) and wheel loaders 70 (see FIG. 7) are operated at the same time. Thus, the type of the loading machine 50 for performing the loading operation onto the dump truck 1 changes depending on the place and the time. Even in such cases, the dump truck employing the present invention is capable of determining a parking direction appropriate for the particular loading machine 50 by judging the type of the loading machine 50 for performing the loading operation.

Figure 5:
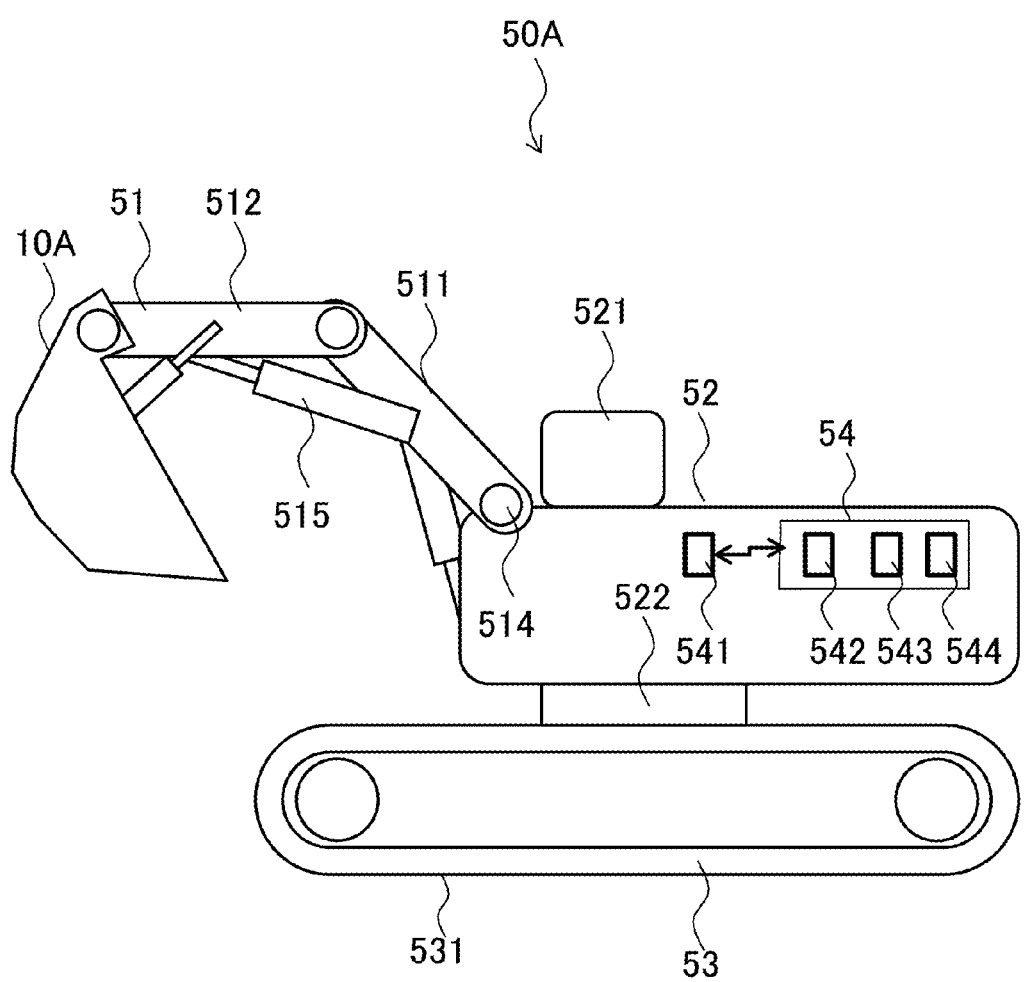
FIG. 5 is a schematic diagram showing the overall configuration of the hydraulic excavator in the first embodiment of the present invention.

An example of application of the present invention to a case where the loading machine 50 is a hydraulic excavator will be described below. FIG. 5 is a schematic diagram showing the overall configuration of a hydraulic excavator in accordance with an embodiment of the present invention.

The hydraulic excavator 50A shown in FIG. 5 comprises a front implement 51 formed of a solid frame structure, a swing structure 52 having a cab 521 for the operator, and a track structure 53 having a drive system 531 allowing the hydraulic excavator 50A to move and travel. As mentioned above, the hydraulic excavator 50A is equipped with the loading machine data calculation device 54 and the loading machine communication device 541.

The front implement 51 mainly includes a boom 511 formed of a solid frame structure, an arm 512, a bucket 10A, pin joint parts 514, and cylinders 515. The bucket 10A (as a vessel for holding and moving the extracted materials, etc.) is connected to the arm 512 via the pin joint part 514, etc. to be rotatable with respect to the arm 512. The arm 512 is connected to the boom 511 via the pin joint part 514, etc. to be rotatable with respect to the boom 511. The boom 511 is connected to the swing structure 52 via the pin joint part 514, etc. to be rotatable with respect to the swing structure 52. The linkages between the swing structure 52 and the boom 511, between the boom 511 and the arm 512, and between the arm 512 and the bucket 10A are made by using the cylinders 515 capable of linear motion. Each cylinder 515 is implemented by a hydraulic cylinder which is driven by hydraulic pressure, for example. The front implement 51 is operated by the driving of the cylinders 515.

The swing structure 52 is connected to the track structure 53 via a swing motor 522, etc. to be rotatable (swingable). The swinging of the swing structure 52 with respect to the track structure 53 also allows the front implement 51 to swing. The swing structure 52 has the cab 521, in which levers, an acceleration pedal, a brake pedal, etc. for the operation of the hydraulic excavator 50A are arranged. The operator can control the hydraulic excavator 50A to make it perform intended operations by operating the levers, the acceleration pedal, the brake pedal, etc.

The track structure 53 is equipped with the drive system 531 to allow the hydraulic excavator 50A to move and travel. The hydraulic excavator 50A is configured to be able to travel to the vicinity of the excavating position by the operation of the track structure 53 and to load the extracted materials onto the bucket 10A (scoop up the extracted materials with the bucket 10A) by actuating the swing structure 52, the boom 511, the arm 512 and the bucket 10A with the cylinders 515.

As mentioned above, the loading machine data calculation device 54 mainly includes the bucket position detection device 542 which measures the position of the bucket 10A of the hydraulic excavator 50A, the loading detection device 543 which detects the loading of the extracted materials onto the bucket 10A, and the loading machine type detection device 544 which detects the type of the loading machine.

The bucket position detection device 542 is configured to be able to detect the position of the bucket 10A of the hydraulic excavator 50A by using a GNSS attached to the bucket 10A, for example. While the position of the center of the bucket is detected as the bucket position in this embodiment, the GNSS may also be attached to a different part such as the connecting part between the arm 512 and the bucket 10A. In such cases, the bucket center position can be calculated by geometric calculation from the positional values detected by the GNSS. It is also possible to arrange the GNSS at a certain position in/on the hydraulic excavator 50A and attach potentiometers or encoders (capable of detecting a rotational angle) to the pin joint parts 514 connecting the boom 511, the arm 512 and the bucket 10A of the front implement 51, to the swing motor 522 between the swing structure 52 and the track structure 53, etc. or attach inclination sensors (capable of detecting an inclination angle) to the boom 511, the arm 512, the bucket 10A, etc. In these cases, the relative positional relationship between the position of the hydraulic excavator 50A and the position of the bucket 10A can be acquired from the data from the sensors, and the position of the bucket 10A can be calculated from the positional relationship and the data. Further, considering the posture of the bucket 10A performing the loading operation onto the dump truck 1, the horizontal position of the bucket center (projected on the horizontal plane) substantially coincides with the position of the connecting part between the arm 512 and the bucket 10A or the tip end of the arm 512. Therefore, the position of the connecting part between the arm 512 and the bucket 10A or the position of the tip end of the arm 512 may also be detected as the position of the bucket 10A.

The loading detection device 543 is configured to be able to detect the loading of the extracted materials onto the bucket 10A based on detection of load variations by sensors on the cylinders 515, for example. In cases where the cylinders 515 are implemented by hydraulic cylinders, pressure sensors capable of detecting the pressures inside the hydraulic cylinders can be used as the sensors for detecting the load variations. It is also possible to arrange an input device that can be operated by the operator (switch, voice input device, etc.) in the cab 521 of the hydraulic excavator 50A. In this case, the detection of the loading onto the bucket 10A can be implemented by an operation on the input device by the operator of the hydraulic excavator 50A when the extracted materials are loaded onto the bucket 10A. The detection of the loading onto the bucket 10A may also be implemented by preparing a database regarding the operations of the hydraulic excavator 50A and judging whether the current operation of the bucket 10A is the loading operation or not by matching the current operation against the database.

The loading machine type detection device 544, in which the ID corresponding to the hydraulic excavator 50A has been registered, for example, is configured to be able to notify the dump truck 1 of the ID via the loading machine communication device 541.

Figure 6:
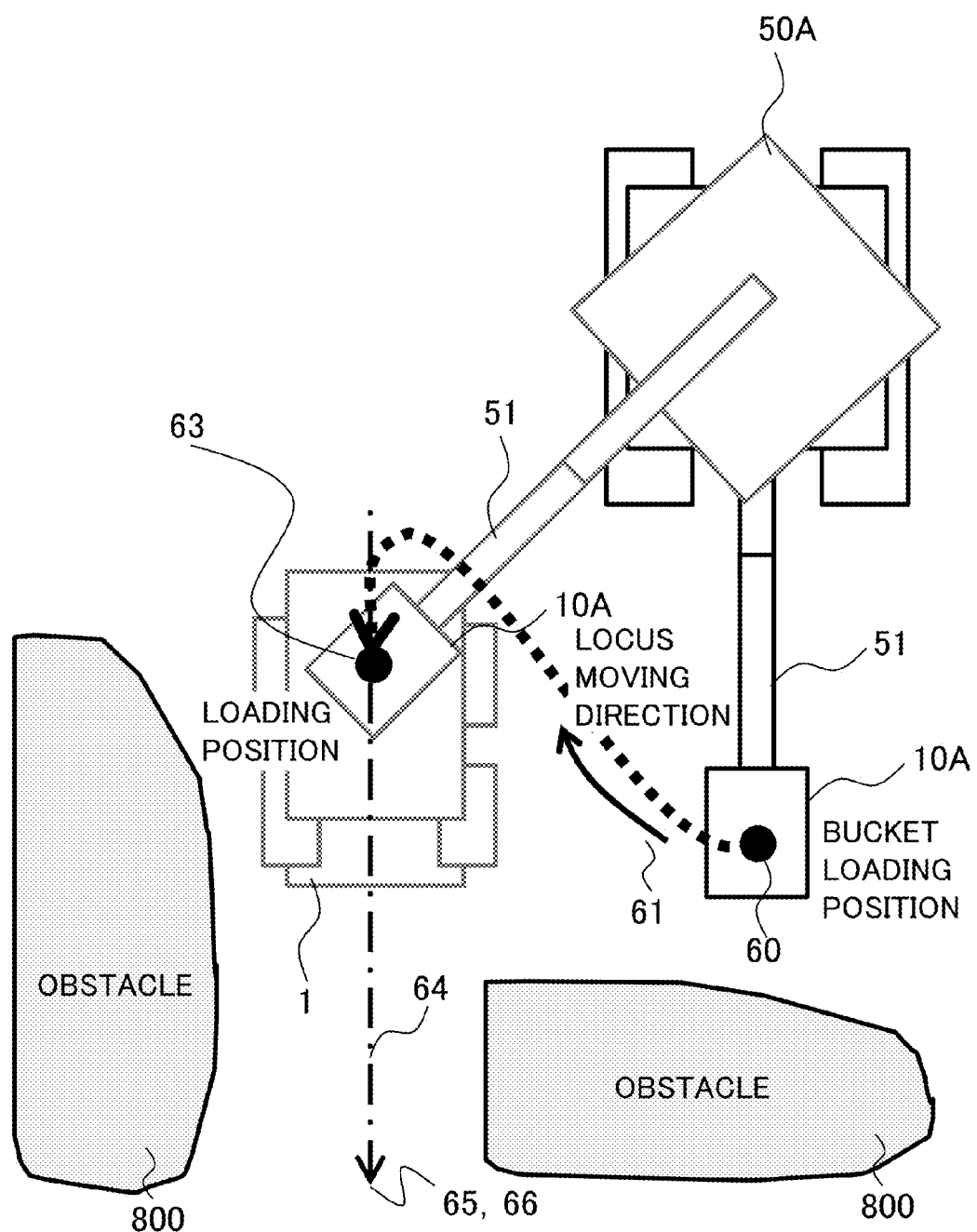
FIG. 6 is a schematic diagram showing how the parking position and the parking direction of the dump truck are determined in a case where the loading machine is a hydraulic excavator.

FIG. 6 shows how the parking position 63 and the parking direction 66 of the dump truck 1 are determined in a case where the loading machine is a hydraulic excavator 50A.

The operator of the hydraulic excavator 50A loads the extracted materials onto the bucket 10A (scoops up the extracted materials with the bucket 10A) at the bucket loading position 60 and moves the bucket 10A to the position for the loading onto the dump truck 1. In this case, the operator of the hydraulic excavator 50A judges suitable position and direction (at/in which the dump truck 1 can arrive and park) in consideration of the presence/absence of nearby obstacles 800, and operates the bucket 10A so as to indicate the position and direction. The dump truck parking position/direction indication system 1000 determines the parking position 63 and the parking direction 66 of the dump truck 1 shown in FIG. 6 according to the procedure shown in FIG. 4.

In this step, when the loading machine judgment device 105 judges that the loading machine is a hydraulic excavator 50A, the tangential direction rotation device 106 rotates the tangential line 64 around the vertical axis orthogonal to the horizontal plane and passing through the parking position 63 by 0 degrees, that is, leaves out the rotation of the tangential line 64. Consequently, the parking direction 66 is determined in the direction shown in FIG. 6.

The autonomous travel device 200 of the dump truck 1 calculates a suitable path connecting its own position and the parking position 63 and the parking direction 66 determined as above. Then, according to the control by the autonomous travel device 200, the dump truck 1 travels so as to trace the path. The dump truck 1 stops and parks when it reaches the parking position 63. In this case, the dump truck 1 does not necessarily have to park precisely at the parking position 63. The dump truck 1 stops and parks when it has entered a parking position area (parking area) having certain error margins. The parking area is determined in consideration of errors of the own position/direction recognition device 202, etc. The employment of the parking area increases the efficiency since the need of finely adjusting the parking position by repeating the forward and backward movement a lot of times is eliminated.

Figure 7:
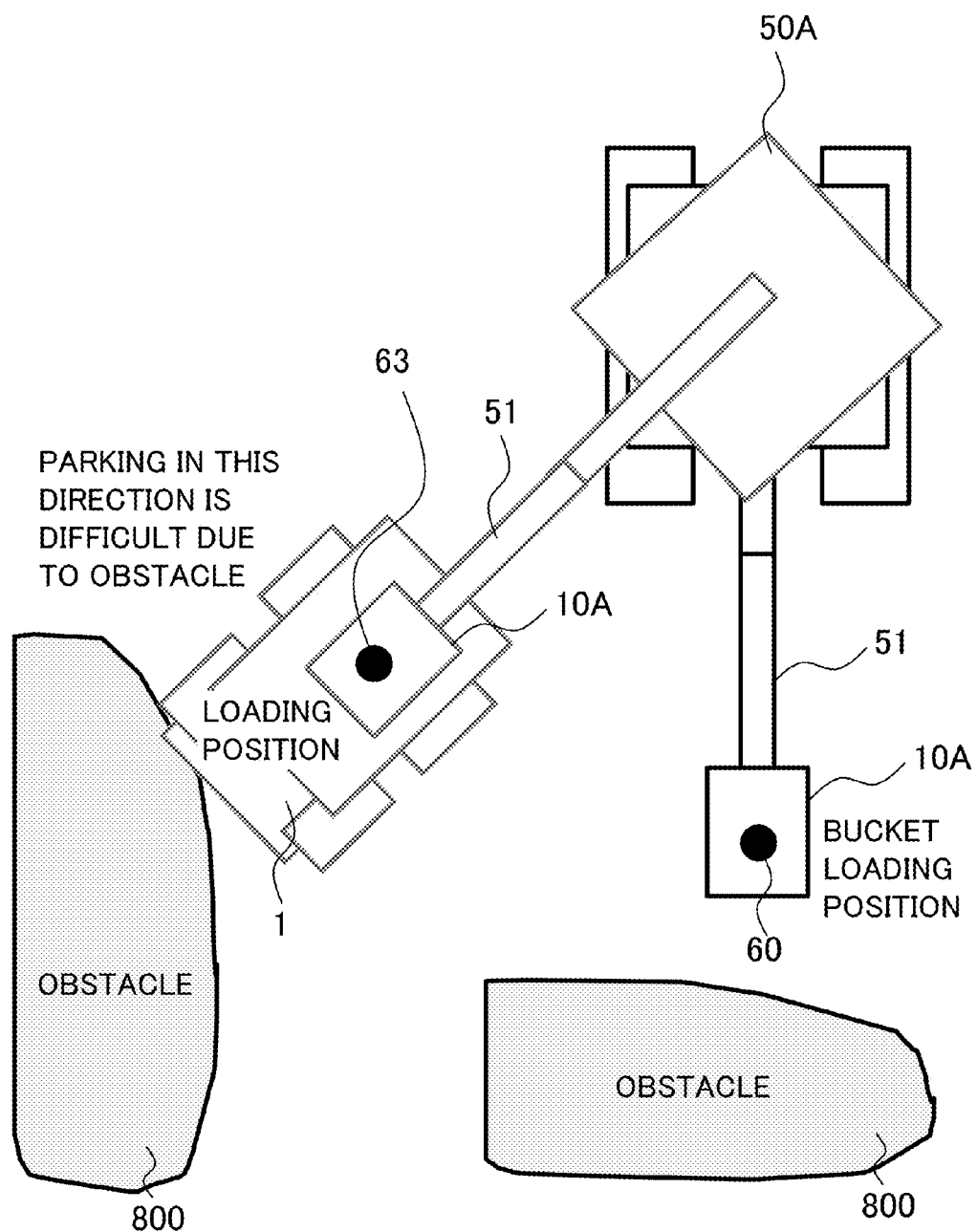
FIG. 7 is a schematic diagram showing the parking position and the parking direction of the dump truck in the conventional technology.

Here, a case where the parking direction of the dump truck is previously determined to be in parallel with the direction of the bucket 10A at the loading position of the hydraulic excavator 50A (as in the conventional technology) will be described below. FIG. 7 is a schematic diagram showing the parking position and the parking direction of the dump truck in the conventional technology.

In cases where nearby obstacles exist as shown in FIG. 7, it can be difficult for the dump truck to stop and park in the direction in parallel with the direction of the bucket 10A. In other words, in the case where the parking position and the parking direction of the dump truck have previously been determined, it might be impossible to command/indicate an efficient parking direction when there exists a nearby obstacle, etc. In contrast, by employing the present invention as shown in FIG. 6, the operator of the hydraulic excavator 50A can determine the parking position 63 and the parking direction 66 not obstructed by the obstacles 800 by properly operating the bucket 10A.

Figure 8:
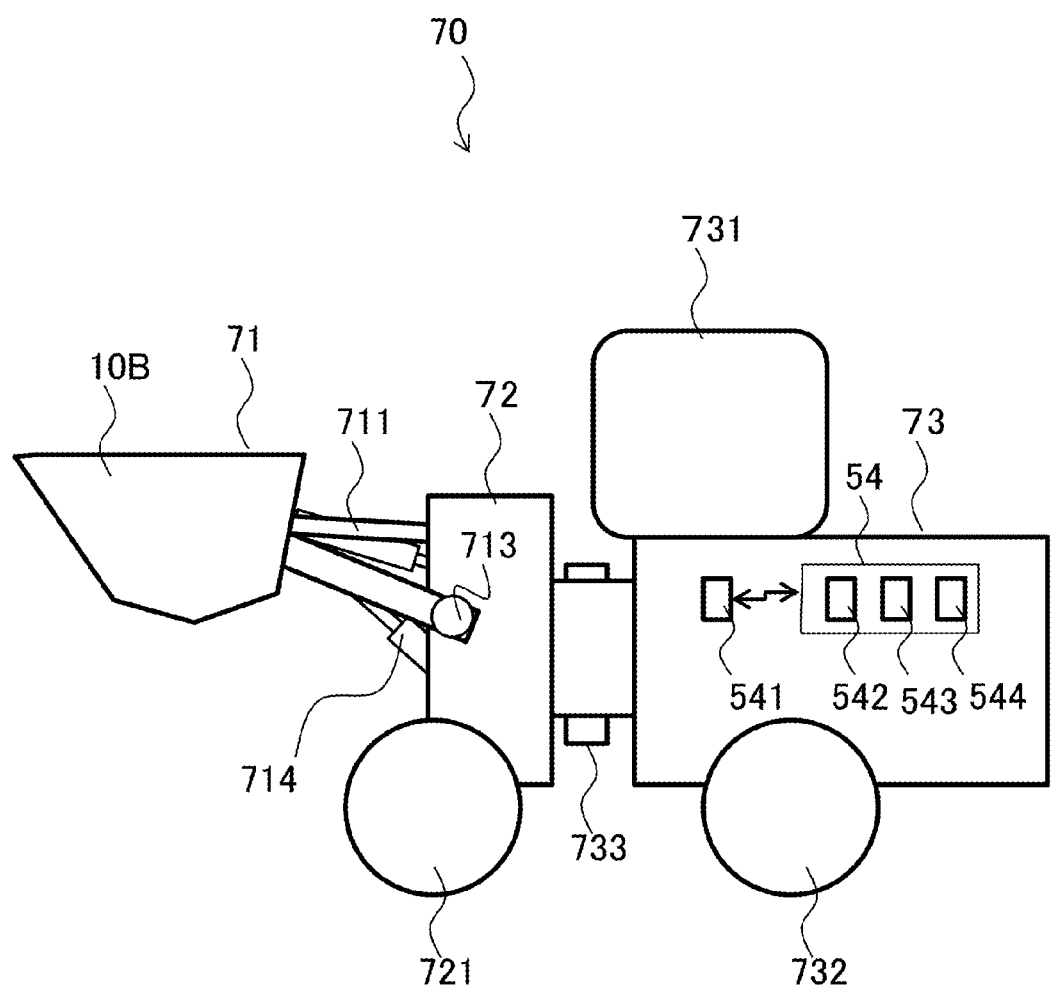
FIG. 8 is a schematic diagram showing the overall configuration of a wheel loader in accordance with the first embodiment of the present invention.

Next, an example of applying the present invention to a case where the loading machine is a wheel loader 70 will be described below. FIG. 8 is a schematic diagram showing the overall configuration of the wheel loader 70 in accordance with an embodiment of the present invention.

The wheel loader 70 shown in FIG. 8 mainly comprises a front implement 71 formed of a solid frame structure, a front wheel structure 72 having front wheels 721, a rear wheel structure 73 having a cab 731 for the operator and rear wheels 732, the loading machine data calculation device 54, and the loading machine communication device 541. The front wheel structure 72 is attached to the rear wheel structure 73 to be bendable around a bend shaft 733.

The front implement 71 mainly includes a lift 711 formed of a solid frame structure and a bucket 10B. The bucket 10B (as a vessel for holding and moving the extracted materials, etc.) is connected to the lift 711 via a pin joint part 713, etc. to be rotatable with respect to the lift 711. The lift 711 is connected to the front wheel structure 72 via a pin joint part 713, etc. to be rotatable with respect to the front wheel structure 72. The linkages between the front wheel structure 72 and the lift 711 and between the lift 711 and the bucket 10B are made by using cylinders 714 capable of linear motion. Each cylinder 714 is implemented by a hydraulic cylinder which is driven by hydraulic pressure, for example. The front implement 71 is operated by the driving of the cylinders 714.

The front wheel structure 72 is connected to the rear wheel structure 73 via the bend shaft 733 to be bendable. The wheel loader 70 is configured to be able to change its traveling direction by changing the angle of the connection at the bend shaft 733. The wheel loader 70 travels by driving at least the front wheels 721 of the front wheel structure 72 or the rear wheels 732 of the rear wheel structure 73.

Arranged in the cab 731 of the rear wheel structure 73 are levers, an acceleration pedal, a brake pedal, etc. for the operation of the wheel loader 70. The operator can make the wheel loader 70 perform intended operations by operating the levers, the acceleration pedal, the brake pedal, etc.

As mentioned above, the loading machine data calculation device 54 mainly includes the bucket position detection device 542 which measures the position of the bucket 10B of the wheel loader 70, the loading detection device 543 which detects the loading of the extracted materials onto the bucket 10, and the loading machine type detection device 544 which detects the type of the loading machine.

The configurations of the bucket position detection device 542 and the loading detection device 543 in the wheel loader 70 are equivalent to those in the hydraulic excavator 50A, and thus repeated explanation thereof is omitted for brevity. The loading machine type detection device 544, in which the ID corresponding to the wheel loader 70 has been registered, is configured to be able to notify the dump truck 1 of the ID via the loading machine communication device 541.

Figure 9:
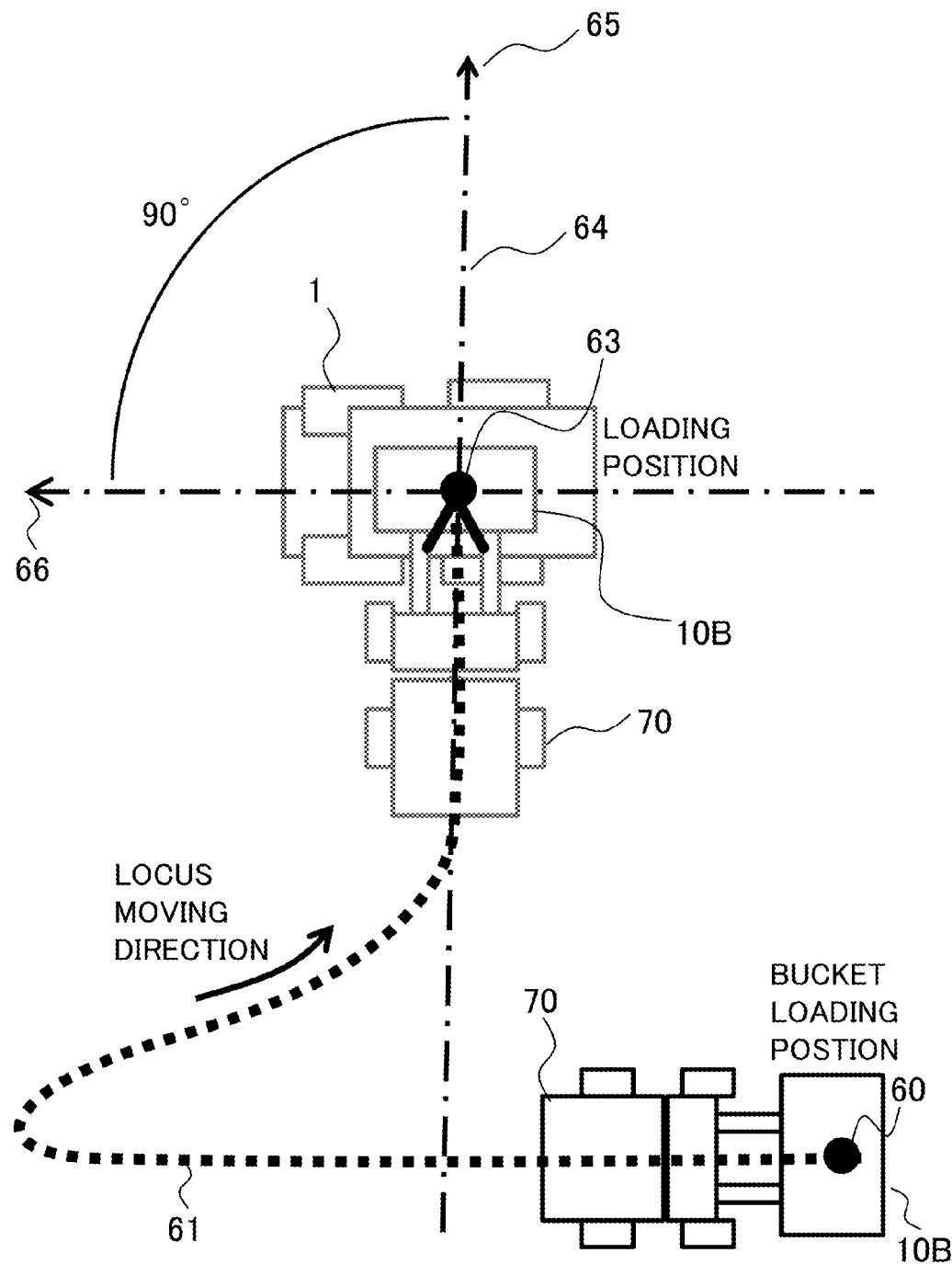
FIG. 9 is a schematic diagram showing how the parking position and the parking direction of the dump truck are determined in a case where the loading machine is a wheel loader in the first embodiment of the present invention.

FIG. 9 shows how the parking position 63 and the parking direction 66 of the dump truck 1 are determined in the case where the loading machine is a wheel loader 70.

The operator of the wheel loader 70 loads the extracted materials onto the bucket 10B (scoops up the extracted materials with the bucket 10B) at the bucket loading position 60 and moves the bucket 10B to the position for the loading onto the dump truck 1. In this case, the dump truck parking position/direction indication system 1000 determines the parking position 63 and the parking direction 66 of the dump truck 1 shown in FIG. 9 according to the procedure shown in FIG. 4.

In this step, when the loading machine judgment device 105 judges that the loading machine is a wheel loader 70, the tangential direction rotation device 106 rotates the tangential line 64 around the vertical axis orthogonal to the horizontal plane and passing through the parking position 63 by 90 degrees so that the tangential direction 65 points the side opposite to the starting point of the movement locus 61. Consequently, the parking direction 66 is determined in the direction shown in FIG. 9.

According to this embodiment, the following effects are achieved:

In the loading operation performed with the loading machine 50 (hydraulic excavator 50A, wheel loader 70, etc.) employing the present invention, the parking position 63 of the dump truck 1 can be determined by the operator of the loading machine 50 by stopping the bucket 10 for T1 seconds or longer at a desired position (where the loading operation onto the dump truck 1 should be performed) after loading the earth, sand, minerals, etc. onto the bucket 10 (scooping up the earth, sand, minerals, etc. with the bucket 10) at the bucket loading position 60. The threshold value T1 may be previously set (e.g., 5 seconds) and passed on to the operator. The parking direction 66 of the dump truck 1 can also be determined by the operator of the loading machine 50 just by properly operating the bucket 10 since the parking direction 66 can be determined from the movement locus 61 of the bucket 10. To sum up, the operator of the loading machine 50 can determine the desirable position and direction of the dump truck 1 (that let the operator easily perform the loading operation) just by operating the bucket 10. Therefore, efficient loading operation is made possible by the selection of the optimum parking position 63 and parking direction 66 by the operator of the loading machine 50 in consideration of the environment, etc. around the position of the loading operation.

Further, the parking position 63 and the parking direction 66 of the dump truck 1 can be commanded/indicated by the operator of the loading machine 50 in the state with the bucket 10 holding the extracted materials for the first loading onto the dump truck 1. This is advantageous from the viewpoint of working efficiency.

Incidentally, the parking position 63 may also be determined by using an input device (e.g., switch) arranged in the cab of the loading machine 50. In this case, the operator after moving the bucket 10 to a desirable parking position 63 determines the parking position 63 by operating the input device. The fact of determining the parking position 63 is detected by the bucket stoppage detection device 103 by data communication or the like. It is also possible to previously determine a sign as a particular action of the bucket 10 that can be detected from the movement locus 61 calculated by the bucket locus calculation device 102. In this case, the bucket stoppage detection device 103 is configured to be able to detect the sign (indicating the determination of the parking position 63) given by the operator of the loading machine 50 by the particular action of the bucket 10. Further, the hydraulic excavator 50A may be equipped with an angle sensor for detecting the operation of the front implement 51, a rotation sensor for detecting the swing angle of the swing structure 52, sensors for detecting the operations on the levers for controlling the front implement 51 and the swing structure 52, sensors for detecting the flow rates of the hydraulic fluid supplied to the hydraulic actuators (cylinders 515, swing motor, etc.), and so forth. In this case, the bucket stoppage detection device 103 may be configured to be able to detect the stoppage of the bucket 10 by monitoring the detection signals from the sensors.

In cases where the allocation management (dispatch control) of the dump truck 1 is conducted by a control station, the loading machine type detection device 544 may be installed in the control station. In this case, the present invention can also be implemented as follows, for example: At the stage when the control station determined the next loading site to which a dump truck 1 should go, the control station transmits an ID corresponding to the type of the loading machine 50 operating in the loading site. The loading machine judgment device 105 of the dump truck 1 verifies the received ID against stored IDs. In cases where there is an operator in the control station, the present invention can also be implemented by having the operator input the type of the loading machine 50 through an input device (e.g., switch).

While the bucket locus calculation device 102, the bucket stoppage detection device 103, the tangential direction calculation device 104, the loading machine judgment device 105 and the tangential direction rotation device 106 are installed in the dump truck 1 in the above explanation of this embodiment, the present invention can be implemented even if the devices 102-106 are installed in the loading machine.

While the bucket position detection device 542, the loading detection device 543 and the loading machine type detection device 544 are arranged in the loading machine in the above explanation of this embodiment, the devices 542-544 may also be arranged in the dump truck 1. For example, the present invention is applicable also to configurations in which the dump truck 1 is equipped with an image sensor or the like and is capable of acquiring information on the type of the loading machine, the loading onto the loading machine, the relative positional relationship between the bucket 10 and the dump truck 1, etc. by detecting the bucket 10 and the loading operation of the loading machine by means of image processing, etc.

Second Embodiment

Figure 10:
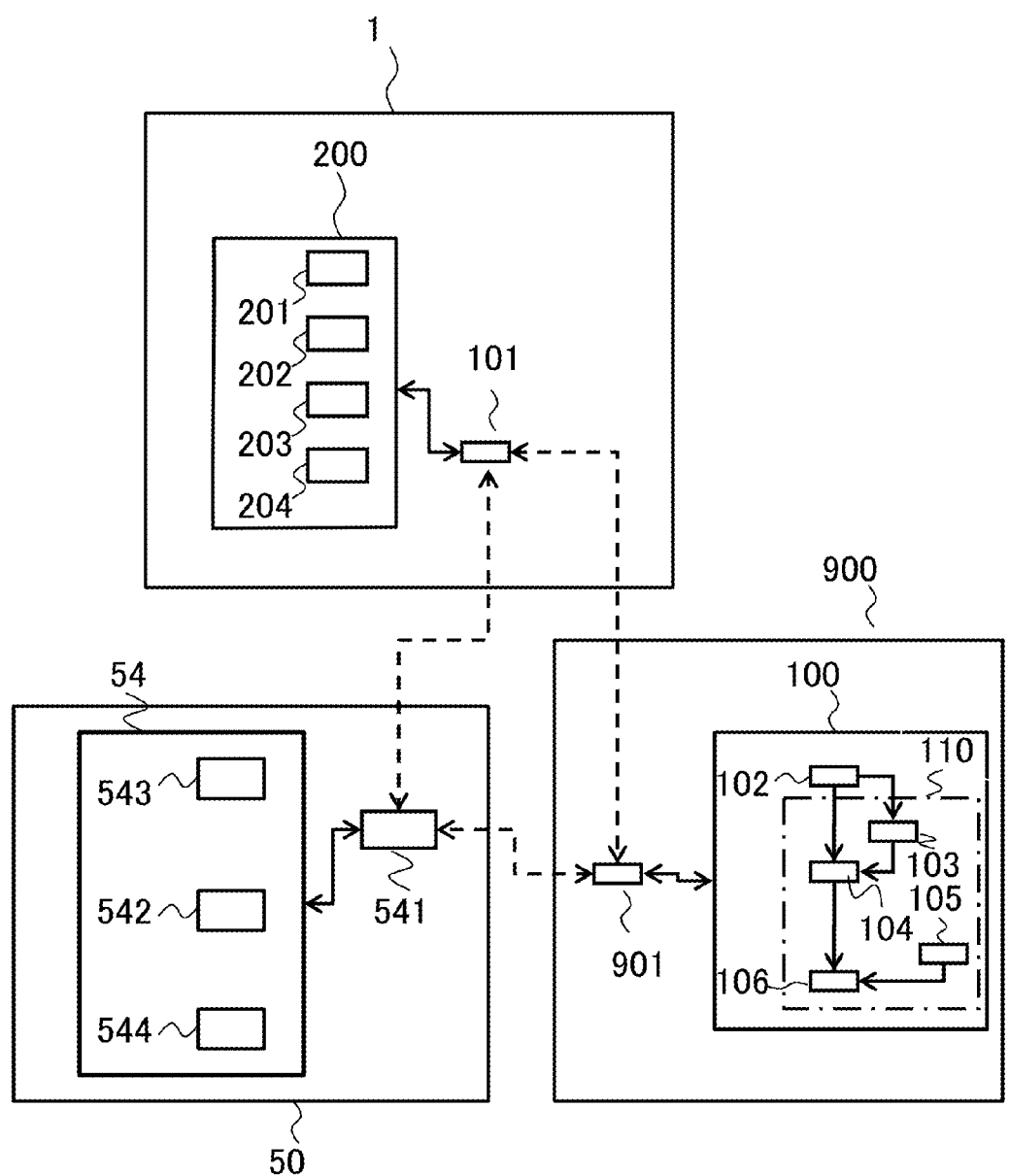
FIG. 10 is a block diagram showing the overall configuration of a dump truck parking position/direction indication system and a hauling system in accordance with a second embodiment of the present invention.

FIG. 10 is a block diagram showing the overall configuration of a dump truck parking position/direction indication system and a hauling system in accordance with a second embodiment of the present invention. This embodiment describes a case where there exists a control station 900 for managing the dump trucks 1 and the loading machines 50 and the control station 900 is equipped with the parking position/direction calculation device 100.

Referring to FIG. 10, a mine is equipped with the control station 900 for managing the status and operation of the dump trucks 1, the loading machines 50, etc. and the operation of the mine.

The control station 900 mainly comprises the parking position/direction calculation device 100 and a control station communication device 901 capable of data communication with the dump trucks 1 and the loading machines 50.

Similarly to the first embodiment, the parking position/direction calculation device 100 mainly includes the bucket locus calculation device 102 and the parking position/direction determination device 110 including the bucket stoppage detection device 103, the tangential direction calculation device 104, the loading machine judgment device 105 and the tangential direction rotation device 106. The parking position/direction calculation device 100 is capable of communicating data with the dump trucks 1 and the loading machines 50 by use of the control station communication device 901.

The dump truck 1 mainly comprises the autonomous travel device 200 and the dump truck communication device 101 capable of data communication with the loading machines and the control station 900.

The loading machine data calculation device 54 installed in the loading machines 50 (hydraulic excavators 50A, wheel loaders 70, etc.) mainly includes the bucket position detection device 542, the loading detection device 543, the loading machine type detection device 544 and the loading machine communication device 541.

In this embodiment, the loading machine data calculation device 54 and the loading machine communication device 541 installed in each loading machine 50 and the parking position/direction calculation device 100 and the control station communication device 901 installed in the control station 900 constitute the parking position/direction indication system 1000 in accordance with the present invention. The loading machines 50, the dump trucks 1, the control station 900 and the parking position/direction indication system 1000 constitute the hauling system in accordance with the present invention.

With the above configuration, the parking position 63 and the parking direction 66 of the dump truck 1 are determined according to the following procedure: When the bucket 10 of the loading machine 50 (hydraulic excavator 50A, wheel loader 70, etc.) is operated for the loading operation, data such as the bucket position detected by the bucket position detection device 542 are transmitted from the loading machine data calculation device 54 of the loading machine 50 to the dump truck parking position/direction calculation device 100 of the control station 900 via the loading machine communication device 541 and the control station communication device 901. The dump truck parking position/direction calculation device 100 of the control station 900 is configured to be able to calculate the parking position 63 and the parking direction 66 of the dump truck 1 from the received data according to a method and procedure equivalent to those described in the first embodiment.

As described above, in this embodiment, the parking position/direction calculation device 100 (which is included in the parking position/direction indication system 1000 described in the first embodiment) is installed in the control station 900. This makes it possible to simplify the configuration of the dump truck 1. In general, a plurality of dump trucks are traveling in a mine. In this embodiment, the cost reduction effect can be expected in comparison with the first embodiment since it becomes unnecessary to install the parking position/direction calculation device 100 in all of the dump trucks.

Further, the present invention can be implemented as long as the bucket locus calculation device 102, the bucket stoppage detection device 103, the tangential direction calculation device 104, the loading machine judgment device 105, the tangential direction rotation device 106, the bucket position detection device 542, the loading detection device 543 and the loading machine type detection device 544 are installed in at least one selected from the dump truck 1, the loading machine and the control station and communication devices capable of data communication with one another are installed in the dump truck 1, the loading machine 50 and the control station 900 as described in the first and second embodiments.

Third Embodiment

Figure 11:
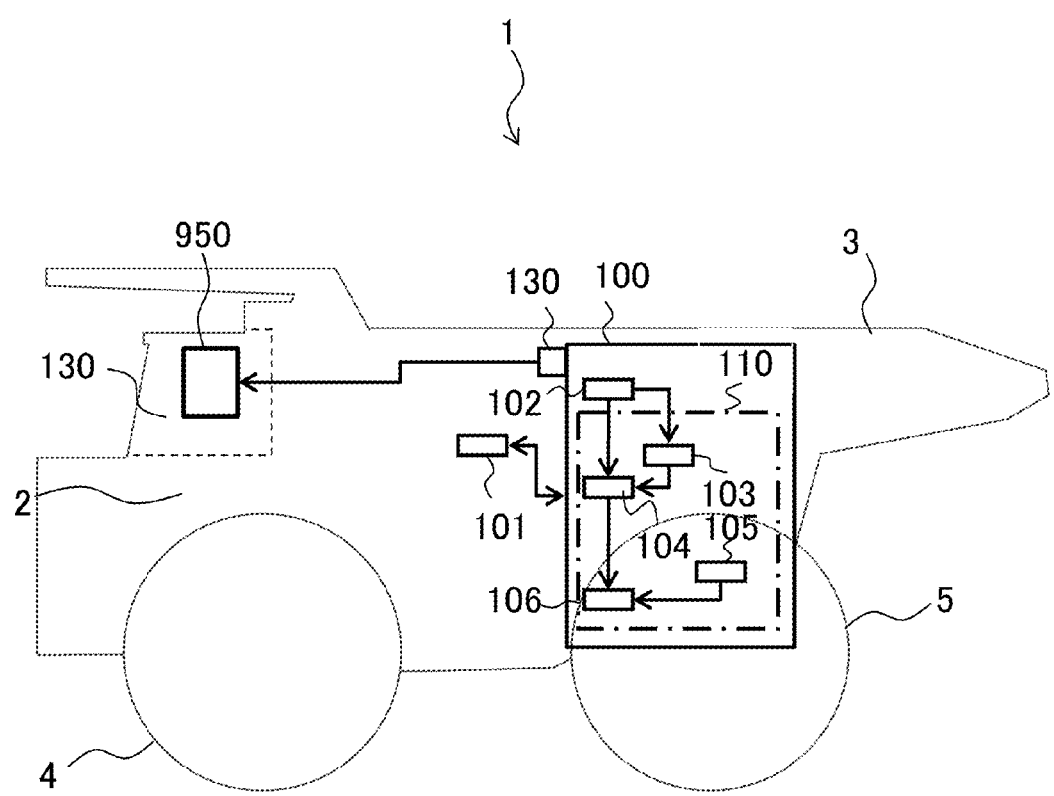
FIG. 11 is a schematic diagram showing the configuration of a dump truck which is equipped with a parking position/direction calculation device of a dump truck parking position/direction indication system in accordance with a third embodiment of the present invention.

FIG. 11 is a schematic diagram showing the configuration of a dump truck which is equipped with a parking position/direction calculation device of a dump truck parking position/direction indication system in accordance with a third embodiment of the present invention. While the dump truck 1 was assumed to be an autonomous dump truck in the first and second embodiments, the present invention is applicable also to a dump truck 1 operated by an operator. This embodiment describes such a case where the dump truck 1 is operated by an operator.

Referring to FIG. 11, the dump truck 1 mainly comprises the parking position/direction calculation device 100, the dump truck communication device 101 capable of data communication with the control station 900 and the loading machines, and a monitor 950. The monitor 950 is arranged in a cab 951 of the dump truck.

In order to notify the operator of the parking position 63 and the parking direction 66 determined by the parking position/direction calculation device 100 with the configuration and procedure described in the first embodiment, the parking position/direction calculation device 100 is equipped with an output device 130. Information on the parking position 63 and the parking direction 66 of the dump truck 1 determined by the parking position/direction determination device 110 is sent to the monitor 950 via the output device 130. The monitor 950 displays the parking position 63 and the parking direction 66.

According to this embodiment, even inexperienced or unaccustomed operators are allowed to recognize the appropriate parking position and parking direction, for example. Therefore, improvement in the working efficiency can be expected.

DESCRIPTION OF REFERENCE CHARACTERS 1 dump truck
2 vehicle 3 vessel
4 front wheel
5 rear wheel
10, 10A, 10B bucket
50 loading machine
50A hydraulic excavator
51 front implement
52 swing structure
53 track structure
54 loading machine data calculation device
60 bucket loading position
61 movement locus
63 parking position
64 tangential line
65 tangential direction
66 parking direction
70 wheel loader
71 front implement
72 front wheel structure
73 rear wheel structure
100 parking position/direction calculation device
101 dump truck communication device
102 bucket locus calculation device
103 bucket stoppage detection device
104 tangential direction calculation device
105 loading machine judgment device
106 tangential direction rotation device
110 parking position/direction determination device
120 output device
130 output device
200 autonomous travel device
201 target position/direction recognition device
202 own position/direction recognition device
203 target path generation device
204 target path tracing device
511 boom
512 arm
514 pin joint part
515 cylinder
521 cab
522 swing motor
531 drive system
541 loading machine communication device
542 bucket position detection device
543 loading detection device
544 loading machine type detection device
711 lift
713 pin joint part
714 cylinder
721 front wheel
731 cab
732 rear wheel
733 bend shaft
800 obstacle
900 control station
901 control station communication device
950 monitor
951 cab
1000 dump truck parking position/direction indication system

The invention claimed is:

1. A dump truck parking position/direction indication system comprising:
   a bucket position detection device (542) that detects the position of a bucket (10) of a loading machine (50);
   a locus calculation device (102) that calculates a movement locus (61) of the bucket based on the positions of the bucket detected by the bucket position detection device;
   a parking position/direction determination device (110) that determines a parking position (63) and a parking direction (66) of a dump truck (1) based on the movement locus calculated by the locus calculation device; and
   an output device (101) that outputs the parking position and the parking direction of the dump truck determined by the parking position/direction determination device.

2. The dump truck parking position/direction indication system according to claim 1, wherein the parking position/direction determination device (110) includes:
   a bucket stoppage detection device (103) that detects a stop position of the bucket in the movement locus (61) calculated by the locus calculation device (102) and determines the stop position of the bucket as the parking position (63) of the dump truck (1); and
   a tangential direction calculation device (104) that calculates a tangential direction (65) based on a tangential line (64) to the movement locus (61) calculated by the locus calculation device (102) at the stop position of the bucket and the moving direction of the movement locus,
   wherein the parking position/direction determination device (110) determines the parking direction (66) of the dump truck (1) based on the tangential direction (65) calculated by the tangential direction calculation device (104).

3. The dump truck parking position/direction indication system according to claim 2, wherein the parking position/direction determination device (110) further includes:
   a loading machine judgment device (105) that judges the type of the loading machine (50); and
   a tangential direction rotation device (106) that determines the parking direction (66) of the dump truck (1) by rotating the tangential direction (65) calculated by the tangential direction calculation device (104) by a prescribed angle corresponding to the type of the loading machine judged by the loading machine judgment device.

4. The dump truck parking position/direction indication system according to claim 2, wherein the bucket stoppage detection device (103) detects the stop position of the bucket by detecting that the movement locus (61) calculated by the locus calculation device (102) does not change for a prescribed time period and determines the stop position of the bucket as the parking position (63) of the dump truck (1).

5. The dump truck parking position/direction indication system according to claim 1, further comprising a loading detection device (543) that detects the loading onto the bucket (10),
   wherein the locus calculation device (102) starts the calculation of the movement locus (61) of the bucket when the loading onto the bucket (10) is detected by the loading detection device.

6. A hauling system comprising a loading machine (50) and a dump truck (1), wherein the hauling system comprises:
   a bucket position detection device (542) that detects the position of a bucket (10) of the loading machine (50);
   a locus calculation device (102) that calculates a movement locus (61) of the bucket based on the positions of the bucket detected by the bucket position detection device;
   a parking position/direction determination device (110) that determines a parking position (63) and a parking direction (66) of the dump truck (1) based on the movement locus calculated by the locus calculation device; and an output device (120; 130) that outputs the parking position and the parking direction of the dump truck determined by the parking position/direction determination device.

7. The hauling system according to claim 6, wherein the parking position/direction determination device (110) includes:

a bucket stoppage detection device (103) that detects a stop position of the bucket in the movement locus (61) calculated by the locus calculation device (102) and determines the stop position of the bucket as the parking position (63) of the dump truck (1); and a tangential direction calculation device (104) that calculates a tangential direction (65) based on a tangential line (64) to the movement locus (61) calculated by the locus calculation device (102) at the stop position of the bucket and the moving direction of the movement locus, wherein the parking position/direction determination device (110) determines the parking direction (66) of the dump truck (1) based on the tangential direction (65) calculated by the tangential direction calculation device (104).

8. The hauling system according to claim 7, wherein the parking position/direction determination device (110) further includes:

a loading machine judgment device (105) that judges the type of the loading machine (50); and a tangential direction rotation device (106) that determines the parking direction (66) of the dump truck (1) by rotating the tangential direction (65) calculated by the tangential direction calculation device (104) by a prescribed angle corresponding to the type of the loading machine judged by the loading machine judgment device.

9. The hauling system according to claim 7, wherein the bucket stoppage detection device (103) detects the stop position of the bucket by detecting that the movement locus (61) calculated by the locus calculation device (102) does not change for a prescribed time period and determines the stop position of the bucket as the parking position (63) of the dump truck (1).

10. The hauling system according to claim 6, further comprising a loading detection device (543) that detects the loading onto the bucket (10), wherein the locus calculation device (102) starts the calculation of the movement locus (61) of the bucket when the loading onto the bucket (10) is detected by the loading detection device.

11. The hauling system according to claim 6, wherein:

the loading machine (50) is equipped with the bucket position detection device (542) and a loading machine communication device (541) capable of data communication with the dump truck (1), and the dump truck (1) is equipped with the locus calculation device (102), the parking position/direction determination device (110), and a dump truck communication device (101) capable of data communication with the loading machine (50).

12. The hauling system according to claim 10, wherein:

the loading machine (50) is equipped with the bucket position detection device (542), the loading detection device (543), and a loading machine communication device (541) capable of data communication with the dump truck, and the dump truck (1) is equipped with the locus calculation device (102), the parking position/direction determination device (110), and a dump truck communication device (101) capable of data communication with the loading machine (50).

13. The hauling system according to claim 6, further comprising a control station (900), wherein:

the loading machine (50) is equipped with the bucket position detection device (542) and a loading machine communication device (541) capable of data communication with the dump truck (1) and the control station (900), and the control station (900) is equipped with the locus calculation device (102), the parking position/direction determination device (110), and a control station communication device (901) capable of data communication with the loading machine (50) and the dump truck (1).

14. The hauling system according to claim 10, further comprising a control station (900), wherein:

the loading machine (50) is equipped with the bucket position detection device (542), the loading detection device (543), and a loading machine communication device (541) capable of data communication with the dump truck (1) and the control station (900), and the control station (900) is equipped with the locus calculation device (102), the parking position/direction determination device (110), and a control station communication device (901) capable of data communication with the loading machine (50) and the dump truck (1).

15. The hauling system according to claim 6, further comprising an autonomous travel device (200) that implements autonomous traveling of the dump truck (1), wherein:

the output device (120) outputs the parking position (63) and the parking direction (66) of the dump truck (1) determined by the parking position/direction determination device (110) to the autonomous travel device (200), and the autonomous travel device (200) controls the traveling of the dump truck (1) so as to realize the parking position (63) and the parking direction (66).

16. The hauling system according to claim 6, further comprising a monitor (950) arranged in a cab (951) of the dump truck (1), wherein:

the output device (130) outputs the parking position (63) and the parking direction (66) of the dump truck (1) determined by the parking position/direction determination device (110) to the monitor (950), and the monitor (950) displays the parking position (63) and the parking direction (66).

* * * * *